(12) United States Patent
Diedrich et al.

(10) Patent No.: US 9,510,182 B2
(45) Date of Patent: Nov. 29, 2016

(54) USER ONBOARDING FOR NEWLY ENROLLED DEVICES

(71) Applicant: AirWatch LLC, Atlanta, GA (US)

(72) Inventors: Kyle Diedrich, Atlanta, GA (US);
Harry Roy Lindsey, IV, Roswell, GA (US); Lisa Stasio, Atlanta, GA (US);
Deep Singh, Roswell, GA (US)

(73) Assignee: AirWatch LLC, Palo Alto, CA (US)

( * ) Notice: Subject to any disclaimer, the term of this patent is extended or adjusted under 35 U.S.C. 154(b) by 63 days.

(21) Appl. No.: 14/675,118

(22) Filed: Mar. 31, 2015

(65) Prior Publication Data
US 2016/0295396 A1 Oct. 6, 2016

(51) Int. Cl.
*H04W 8/18* (2009.01)
*H04W 48/16* (2009.01)

(52) U.S. Cl.
CPC .............. *H04W 8/18* (2013.01); *H04W 48/16* (2013.01)

(58) Field of Classification Search
CPC ................................ H04W 8/18; H04W 48/16
USPC .............................. 455/418–420, 410–414.4
See application file for complete search history.

(56) References Cited

U.S. PATENT DOCUMENTS

| | | | |
|---|---|---|---|
| 7,218,926 B2* | 5/2007 | Bocking | H04L 12/5895 455/410 |
| 2004/0198335 A1* | 10/2004 | Campen | H04M 3/42144 455/419 |
| 2005/0155062 A1* | 7/2005 | Hiltunen | H04N 7/0882 725/46 |
| 2005/0246343 A1* | 11/2005 | Burns | H04L 12/2697 |
| 2006/0031681 A1* | 2/2006 | Smith | H04W 12/06 713/182 |
| 2006/0099965 A1* | 5/2006 | Aaron | H04M 1/72572 455/456.3 |
| 2006/0155429 A1* | 7/2006 | Boone | B60K 35/00 701/1 |
| 2012/0304216 A1* | 11/2012 | Strong | H04N 21/44028 725/25 |
| 2013/0203400 A1* | 8/2013 | Ricci | H04W 4/046 455/418 |
| 2014/0213234 A1* | 7/2014 | Inselberg | H04W 4/021 455/418 |
| 2014/0278895 A1* | 9/2014 | Grimes | G06Q 30/0231 705/14.31 |
| 2015/0006099 A1* | 1/2015 | Pham | G01C 17/38 702/93 |

* cited by examiner

*Primary Examiner* — Sharad Rampuria

(57) ABSTRACT

Disclosed are various embodiments for onboarding users of devices newly enrolled with a remote service. According to various embodiments described herein, a computing environment operated by an enterprise can be employed to disable a function of a client device owned or operated by a user. The computing environment is employed to determine a role of the user. Content to be presented on the client device can be determined based at least in part on the role of the user. In response to a determination that the content has been presented to, viewed, and/or consumed by the user of the client device, the computing environment may remotely enable the previously disabled function of the client device.

20 Claims, 9 Drawing Sheets

USER ONBOARDING FOR NEWLY ENROLLED DEVICES

BACKGROUND

In a bring-your-own-device (BYOD) environment, an enterprise may permit an employee to utilize his or her own device, such as a smartphone, tablet, or laptop, to access enterprise data, including e-mail, documents, applications, and other corporate files. Allowing access to enterprise data creates risk for the enterprise as the enterprise lacks control over the device. Further, the device can be subject to tampering, theft, or malware.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
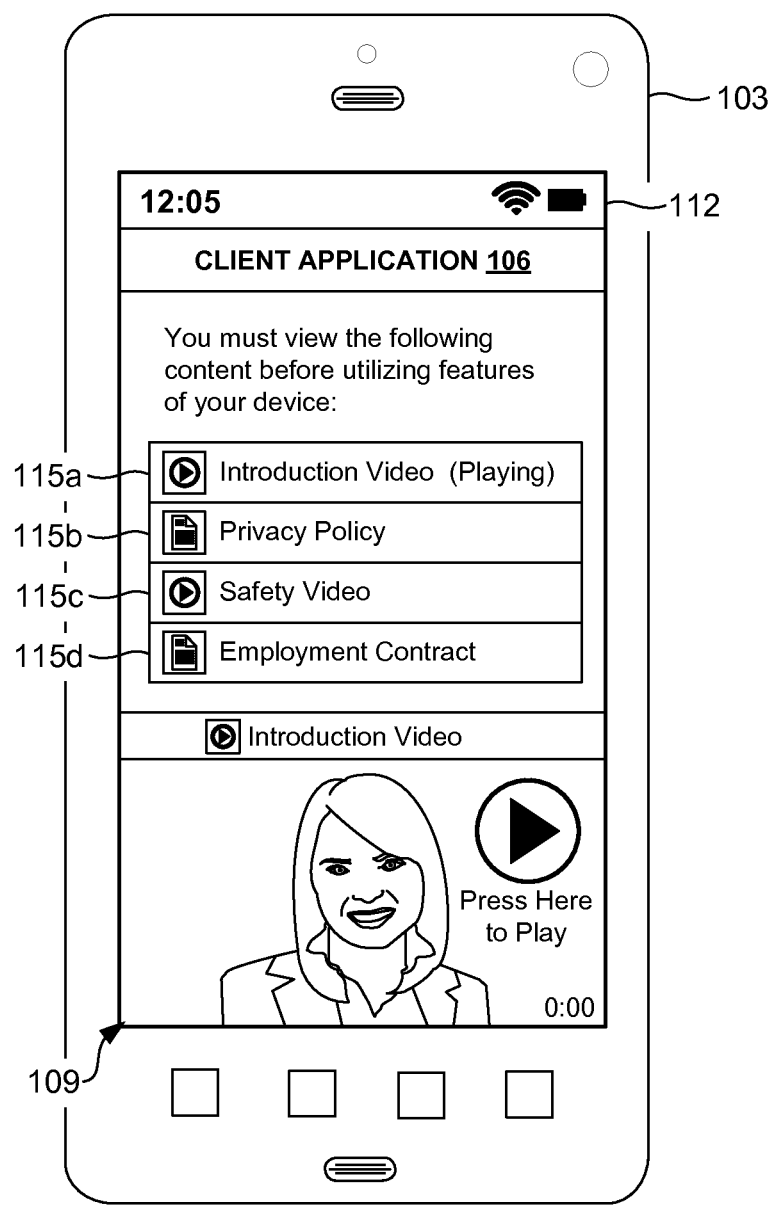
FIG. 1 is a drawing of a user interface for a client application rendered on a client device according to various embodiments of the present disclosure.

The present disclosure relates to onboarding users of devices newly enrolled with a remote service. As discussed above, in a bring-your-own-device (BYOD) environment, an enterprise may permit an employee to utilize his or her own device, such as a smartphone, tablet, or laptop, to access enterprise data, including e-mail, documents, and applications. Allowing access to enterprise data creates risk for the enterprise as the enterprise lacks control over the device. For example, the device can be subject to tampering, theft, or malware. Further, training employees and contractors on enterprise policies that may minimize risk remains costly and is time consuming. By sending data retention policies, privacy policies, instructional videos, other similar content to employees via e-mail, the enterprise has little knowledge whether the employees have actually read, watched, or otherwise consumed the content.

As a non-limiting example, an enterprise may require that drivers (or other employees that drive vehicles in their scope of employment) watch a driver safety video before operating a vehicle. Additionally, the enterprise may desire that the drivers consent to privacy policies, terms of service, or other similar agreements. Finally, the enterprise may require that drivers sign an employment contract or other documents. According to various embodiments of the present disclosure, a device provided to a user by the enterprise, or a device brought by the employee to the workplace, can be used to "onboard" the user according to their scope of employment. For example, assuming an employee is a driver for a particular enterprise, the employee can be required to watch a driver safety video before driving a vehicle in their scope of employment.

According to various embodiments described herein, a computing environment operated by an enterprise can be employed to disable a function of a client device owned or operated by a user, such as an employee or an independent contractor. The function of the client device can be disabled in response to an enrollment of the client device with a remote management service. During the enrollment, the computing environment can associate the client device with a user account in a data store by requiring the user to provide credentials or other information that can be used to authenticate the user of the client device.

Further, the computing environment is employed to determine a role of the user. In various embodiments, the role of the user can be determined based at least in part on a job title for the user or other similar information. Content to be presented on the client device can be determined based at least in part on the role of the user. For example, a driver safety video can be presented to a user with a job title of "Driver." In response to a determination that the content has been presented to, viewed, and/or consumed by the user of the client device, the computing environment can remotely enable the previously disabled function of the client device.

As shown in the example scenario of FIG. 1, a client device 103 can comprise a smartphone, a mobile device, or any other computing device. A client application 106 executable in the client device 103 can generate a user interface 109 rendered in a display 112 of the client device 103. In the example scenario of FIG. 1, the client application 106 generates a series of user interfaces 109 to "onboard" a user. Onboarding can include, for example, providing a user of the client device 103 with certain content before allowing the user to perform certain job functions and/or use certain features of the client device 103.

For example, an enterprise may permit a newly hired employee or independent contractor to use their own device while working for the enterprise or, in other situations, the enterprise may provide the driver with a device. Before being permitted to perform work-related functions, the employee can be required to install and/or execute the client application 106 to enroll the device with a remote management service. The remote management service can be configured to provide the user with certain content and ascertain whether the user has read, watched, or otherwise consumed the content.

Additionally, an enterprise may require the newly hired employee to agree to and/or sign employment agreements, privacy policies, terms of services, or other similar agreements. Further, the enterprise may require the newly hired employee to read employee handbooks or watch workplace related videos. In the example of FIG. 1, the client device 103 is used to onboard the user by requiring the user to watch an "Introduction Video," read a "Privacy Policy," watch a "Safety Video," and/or read and sign an "Employment Contract."

As the client application 106 can be executed to present content to the user of the client device 103, the client application 106 can be configured to display various content files 115a . . . 115d (collectively content files 115) including word documents, spreadsheets, presentations, media files, such as digital images, audio files, and/or video files, or other suitable file types. In various embodiments, the content files 115 can be rendered in one or more positions in the user interface 109 while facilitating a view or selection of other content files 115. For example, a listing of the content files 115 to be consumed by the user during the onboarding process can be presented in a top portion of the user interface 109 while a corresponding one of the content files 115 can be rendered in the bottom portion of the user interface 109, or vice versa. As can be appreciated, the user may watch the "Introduction Video," shown in the bottom portion of the user interface 109, while being able to select other content files 115, such as the "Privacy Policy," the "Safety Video," and the "Employment Contract."

In various embodiments, the user must acknowledge viewing a content file 115 designated as "required" before accessing features of the client device 103. For example, the user can be required to watch the "Introduction Video" in its entirety before being able to access particular functions of the client device 103. To this end, the functions of the client device 103 can include accessing other client applications 106, accessing a home screen of an operating system executable on the client device 103, viewing global positioning system (GPS)-based navigation applications, utilizing hardware components, such as a camera or a speaker of the client device 103, or utilizing software components, such as drivers, applications, or functions of the operating system of the client device 103.

In various embodiments, the content files 115 to be viewed by the user of the client device 103 can be preloaded in local memory of the client device 103 before the client device 103 is provided to the user. In alternative embodiments, the content files 115 to be viewed by the user of the client device 103 can be downloaded by the client application 106 in response to an installation and/or an execution of the client application 106. In alternative embodiments, the content to be consumed by the user of the client device 103 can be streamed by the client application 106 such that a download of the content is not required.

Further, in the example scenario of FIG. 1, when a user selects one of the items of content in the list, the corresponding content file 115 can be accessed by the client application 106 or, in some embodiments, by an appropriate application on the client device 103. For example, by selecting the document entitled "Privacy Policy," a word processing application executable on the client device 103 can be launched to display the corresponding document file. Alternatively, by selecting the document entitled "Privacy Policy," the content file 115 can be shown in the user interface 109 of the client application 106, as depicted in the scenario of FIG. 1.

Figure 2:
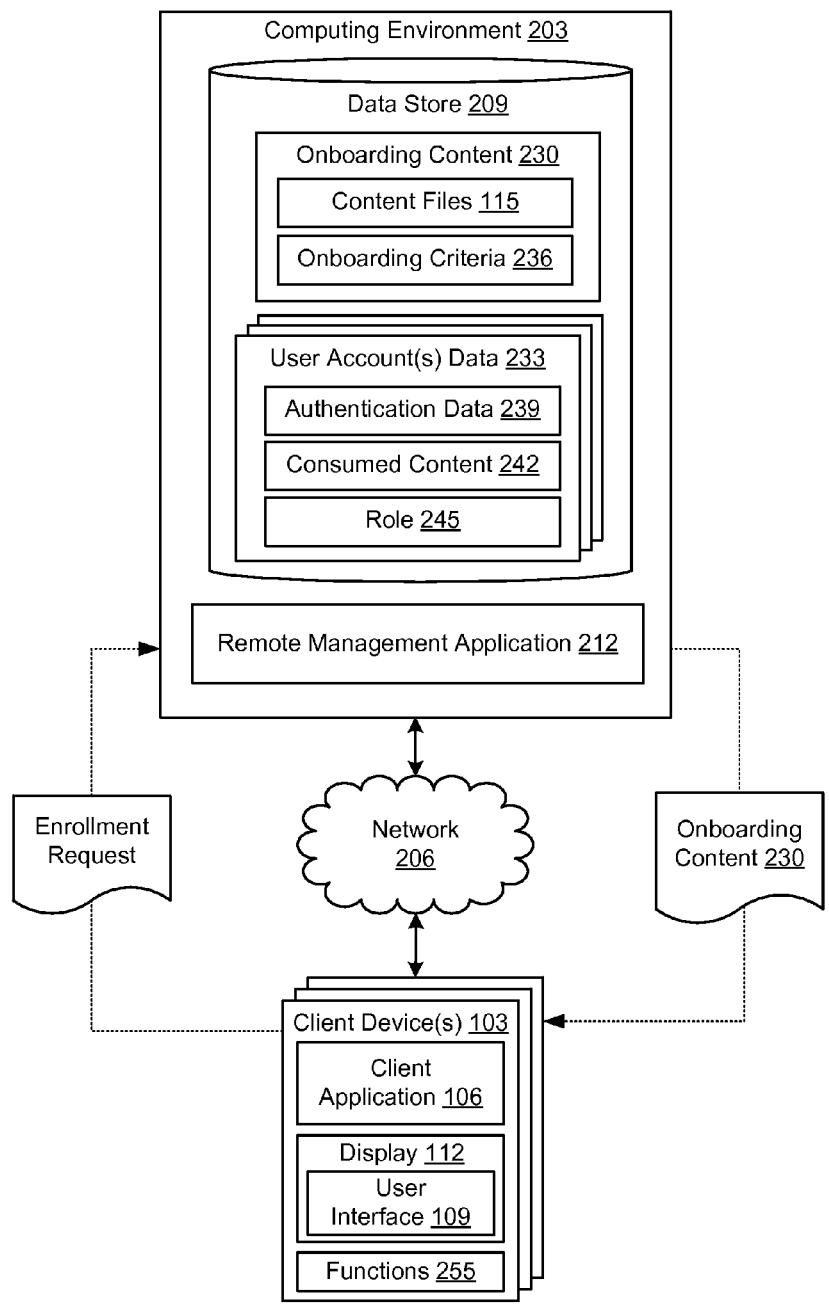
FIG. 2 is a drawing of a networked environment according to various embodiments of the present disclosure.

With reference to FIG. 2, shown is a networked environment 200 according to various embodiments. The networked environment 200 includes a computing environment 203 and a client device 103 which are in data communication with each other over a network 206. The network 206 includes, for example, the Internet, one or more intranets, extranets, wide area networks (WANs), local area networks (LANs), wired networks, wireless networks, other suitable networks, or any combination of two or more such networks. For example, such networks can comprise satellite networks, cable networks, Ethernet networks, telephony networks, and other types of networks.

The computing environment 203 can comprise, for example, a server computer or any other system providing computing capability. Alternatively, the computing environment 203 can comprise a plurality of computing devices that can be arranged, for example, in one or more server banks or computer banks or other arrangements. For example, the computing environments 203 can comprise a grid computing resource and/or any other distributed computing arrangement. Such computing devices can be located in a single installation or can be distributed among many different geographical locations. For purposes of convenience, the computing environment 203 is referred to herein in the singular. Even though the computing environment 203 is referred to in the singular, it is understood that a plurality of computing environments 203 can be employed in the various arrangements as described above.

The data store 209 can comprise memory of the computing environment 203, mass storage resources of the computing environment 203, or any other storage resources on which data can be stored by the computing environment 203. The data store 209 can also be representative of a plurality of data stores 209 as can be appreciated. The data stored in the data store 209, for example, is associated with the operation of the various applications and/or functional entities described below. The data store 209 can be representative of, for example, a database or a collection of databases.

The components executed by the computing environment 203, for example, include a remote management application 212 and other applications, services, processes, systems, engines, or functionality not discussed in detail herein. Generally, the remote management application 212 can be executed to facilitate an onboarding of a user of a device during an enrollment of the device with the remote management application 212. Onboarding can include, for example, providing a user of the client device 103 with certain content before allowing the user to perform certain job functions and/or use certain features of the client device 103. In addition, the remote management application 212 can be configured to determine whether a user has read, viewed, or otherwise consumed individual ones of the content files 115.

The data stored in the data store 209 includes, for example, onboarding content 230, user account data 233, and potentially other data. Onboarding content 230 includes one or more content files 115 to be sent to a user of the client device 103 that is to be consumed by the user during the onboarding process. Further, the onboarding content 230 includes onboarding criteria 236 that must be satisfied before certain functions of the client device 103 are enabled to the user by the remote management application 212. To this end, the onboarding criteria 236 can specify whether a particular content file is "required" to be read, watched, or otherwise consumed by the user before enabling access to particular features of the client device 103. For example, before using a camera of the client device 103, the user can be required to watch a video having content that outlines camera policies for an enterprise. By watching the video, the camera hardware (as well as applications that utilize the camera hardware) can be enabled.

User account data 233 includes data for each of the users of the client device 103 enrolled with the remote management application 212. The user account data 233 includes, for example, authentication data 239, a listing of consumed content 242, and a role 245. The authentication data 239 includes data used to authenticate a user of the client device 103, as can be appreciated. To this end, the authentication data 239 can include a username, a password, an email address, biometric data, or other information that can be used to authenticate a user during an enrollment of the client device 103 with the remote management application 212.

The listing of consumed content 242 includes one or more of the content files 115 that have been acknowledged by the remote management application 212 as being read, watched, or otherwise consumed by the user. The role 245 for a given user can include, for example, a position or title of the user relative to an enterprise. The role 245 can be used to determine which of the content files 115 to present to which users. For example, a user having a legal position can be required to read legal-related content during the onboarding process while a different user having a sales position can be required to read sales-related content during the onboarding process.

The client device 103 is representative of one or more client devices 103 capable of being enrolled with the remote management application 212. The client device 103 can comprise, for example, a processor-based system, such as a computer system, that can be embodied in the form of a desktop computer, a laptop computer, a personal digital assistant, a cellular telephone, a smartphone, a set-top box, a music player, a tablet computer system, a game console, an electronic book reader, or any other device with like capability. The client device 103 can include a display 112 that comprises, for example, one or more devices, such as liquid crystal display (LCD) displays or other types of display devices. The client device 103 can also be equipped with networking capability or networking interfaces, including a localized networking or communication capability, such as an NFC capability, RFID read and/or write capability, a microphone and/or speaker, or other localized communication capability.

Further, the client device 103 can be described as having functions 255, such as hardware functions, software functions, or networking functions. The functions 255 of the client device 103 can be enabled and/or disabled by the client application 106 at the direction of the remote management application 212. In various embodiments, the software functions of the client device 103 that can be enabled and/or disabled include an ability to access at least one different client application, access a home screen of an operating system of the client device, view a GPS-based navigation application, or utilize a driver of the client device. In various embodiments, the hardware functions of the client device 103 that can be enabled and/or disabled include an ability to utilize a camera of the client device, a location module of the client device, a display of the client device, or a speaker of the client device. The networking functions of the client device 103 that can be enabled and/or disabled include an ability to access certain networks beyond the network 206, such as a corporate intranet, peer-to-peer networks, Bluetooth networks, or other suitable networks. Further, the networking functions of the client device 103 that can be enabled and/or disabled include an ability to receive Internet packets not associated with the remote management application 212.

The client device 103 can be configured to execute various applications, such as the client application 106. The client application 106 can be executed in the client device 103, for example, to access network content served up by the computing environment 203 and/or other servers, thereby rendering a user interface 109 on the display 112. To this end, the client application 106 can comprise, for example, a browser or a dedicated application, and the user interface 109 can comprise a network page or an application screen. The client device 103 can be configured to execute applications beyond the client application 106 such as email applications, GPS-based navigation applications, social networking applications, word processors, spreadsheets, and/or other applications. Further, the client application 106 can be executed to provide content files 115 to the user and to determine whether the content files 115 have been read, watched, or otherwise consumed by the user.

Next, a general description of the operation of the various components of the networked environment 200 is provided. To begin, in one example, a user can power on a new client device 103 for a first time or can perform an initial execution of the client application 106. As a result, the client application 106 can require enrollment of the client device 103 with the remote management application 212 prior to using various functions 255 of the client device 103. Before using the various functions 255 of the client device 103, the user can be required to participate in an onboarding process where certain content files 115 are required to be viewed by the user.

For example, when beginning employment, a client device 103 can be provided to a user by an enterprise. Alternatively, the user may bring his or her client device 103 to a workplace in a BYOD environment. The enterprise may have a policy that certain employees are required to view content associated with a role 245 of the user. The client device 103 can be employed to perform an onboarding process where a user of the client device 103 is provided with certain content before the user is permitted to perform certain job functions and/or use certain features of the client device 103. For example, assuming an employee is a driver for a particular enterprise, the employee can be required to watch a driver safety video before driving a vehicle in their scope of employment. Accordingly, it can be assumed that the user has been begun an onboarding process using the client device 103, for example, by powering on the client device 103, downloading the client application 106, and/or executing the client application 106.

In response to an initial installation and/or execution of the client application 106, the remote management application 212 can be configured to remotely disable one or more functions 255 of the client device 103. The functions 255 disabled can include, for example, an ability to access other client applications 106, navigate to a home screen of an operating system executable on the client device 103, utilize GPS-based navigation applications, operate hardware components, such as a camera or a speaker of the client device 103, utilize software components, such as drivers, applications, or functions 255 of the operating system of the client device 103, and/or other functions 255. However, in various embodiments, the client device 103 can come preloaded with certain functions 255 disabled. To this end, the remote management application 212 can determine whether particular functions 255 are disabled and, if not, proceed to disable those functions 255.

In various embodiments, the one or more functions 255 of the client device 103 are disabled based on a role 245 of the user. For example, if the user is a driver in his or her scope of employment, the GPS module of the client device 103 can be disabled or otherwise rendered inaccessible. Upon execution of the client application 106, the client application 106 can require the user to provide credential or other data for authenticating the user and/or the client device 103. Authentication of the client device 103 can include, for example, providing a username, password, email address, biometric data, or other information that can be compared to authentication data 239 in the data store 209. However, in some embodiments, the authentication can be performed solely by comparing a unique identifier of the client device 103 to an identifier stored in the data store 209.

Next, content files 115 residing in the data store 209 can be identified for the user. In various embodiments, the content files 115 can be identified based on the role 245 of the user. For example, a user having a legal position can be required to read legal-related content during the onboarding process while a different user having a sales position can be required to read sales-related content during the onboarding process. Identifying the content files 115 for the user can include accessing corresponding content files 115 not previously consumed by the user from the data store 209 for communication to the client device 103 over the network 206.

After identifying the content files 115 for the user, the remote management application 212 communicates the content files 115 over the network 206 for rendering on the client device 103. In various embodiments, the content files 115 to be consumed by the user of the client device 103 can be preloaded in local memory of the client device 103 before the client device 103 is provided to the user. With respect to these embodiments, the remote management application 212 can direct the client application 106 to access the content files 115 from the local memory of the client device 103. In alternative embodiments, the client application 106 downloads the content file 115 to be consumed by the user of the client device 103 from the remote management application 212. In other embodiments, the content files 115 can be streamed by the remote management application 212 to the client application 106 such that a complete download of the content on the client device 103 is not required.

The client application 106 can require user input from the user that indicates that the user has viewed or otherwise consumed a particular content file 115. Accordingly, in various embodiments, the client application 106 can measure a time that a particular content file 115 has been rendered in the display 112 of the client device 103. For example, a long rendering time can be indicative of the content actually being viewed or otherwise consumed by the user. The time the content file 115 has been rendered in the display 112 can be compared against a predefined threshold to determine whether the content file 115 has been consumed.

In embodiments where a content file 115 includes a document, such as a word processing document or a spreadsheet, the client application 106 can determine whether the user has scrolled through a majority of or to an end of the document. In other embodiments, the client application 106 can utilize a camera of the client device 103 to determine whether a face of a user has been in a direction towards the display 112 of the client device 103 for a predefined amount of time. Consequently, the time the user has viewed a content file 115 being rendered in the display 112 can be compared against a predefined threshold to determine whether the content file 115 has been consumed, the predefined threshold indicative of the content file 115 being consumed by the user.

In various embodiments, the user can be prompted with a series of one or more user interfaces 109 to provide questions to the user associated with the allegedly consumed content file 115, for example, to determine whether the user was paying attention. If the user answers a certain number of questions that exceeds a predefined threshold, it can be determined that the content file 115 has been consumed by the user. Assuming all content files 115 are required to be viewed by a user have been viewed on the client device 103, functions 255 of the client device 103 can be remotely enabled by the remote management application 212. The functions 255 of the client device 103 can include the functions 255 previously disabled by the remote management application 212 or, in some embodiments, the functions 255 of the client device 103 remotely enabled can include functions 255 beyond those disabled by the remote management application 212.

Figure 3A:
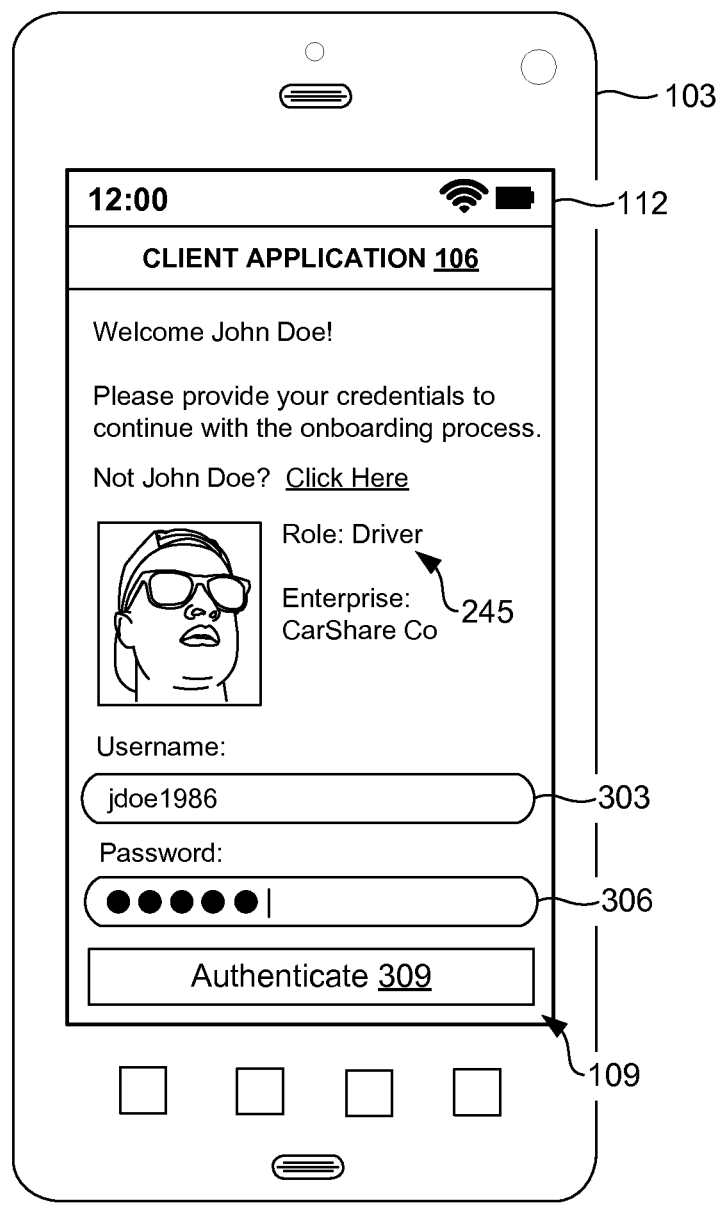
FIGS. 3A-3E are drawings of user interfaces for a client application rendered on a client device according to various embodiments of the present disclosure.

Referring next to FIG. 3A, a scenario is shown where the client application 106 can be executed on the client device 103 to authenticate a user and/or the client device 103. According to various embodiments, authentication of the client device 103 can include, for example, providing a username, password, email address, biometric data, or other information that can be compared to authentication data 239 (FIG. 2) in the data store 209 (FIG. 2). In alternative embodiments, the authentication can be performed by comparing a unique identifier of the client device 103 to an identifier stored in the data store 209.

For example, the user can provide a username 303, such as "doe1986," and a password 306. By manipulating the authenticate component 309, the credentials can be sent to the remote management application 212 over the network 206 (FIG. 2) to perform a comparison of the username 303 and password 306 to authentication data 239 stored in the data store 209. Further, the user interface 109 of FIG. 3A can be rendered in the display 112 to show a role 245 of the user as well as an enterprise operating the remote management application 212. In various embodiments, the client device 103 may come preloaded with information associated with the particular user. For example, the client device 103 may have information stored that only lets a particular user, such as "John Doe," attempt to use the client device 103 and/or enroll the client device 103 with the remote management application 212.

Figure 3B:
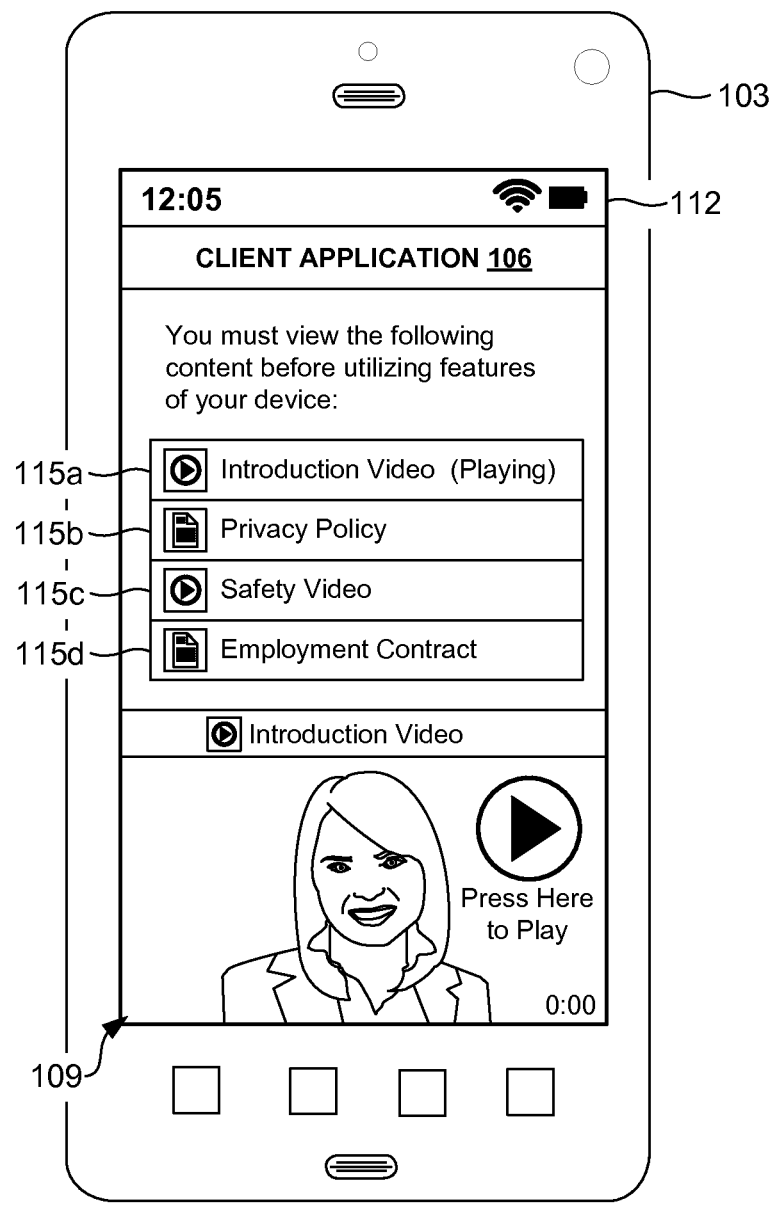

Moving on to FIG. 3B, the client application 106 executable in the client device 103 is shown rendering a user interface 109 in a display 112 of the client device 103. In the example scenario of FIG. 3B, the user interface 109 is shown to a user after authentication to "onboard" the user. As noted above, onboarding can include, for example, providing a user of the client device 103 with certain content before allowing the user to perform certain job functions and/or use certain features of the client device 103.

In various embodiments, the client application 106 is configured to display content files 115a . . . 115d (collectively content files 115) including word documents, spreadsheets, presentations, media files, such as digital images, audio files, and/or video files, or other suitable file types. The content files 115 shown to the user can include content files 115 that are designated as "required" or "optional." As can be appreciated, the content files 115 designated as "required" must be viewed by the user before certain functions 255 of the client device 103 are accessible to the user.

Further, by selecting at least one of the content files 115, the selected one of the content files 115 can be rendered in a suitable position of the user interface 109. In various embodiments, the position is determined to facilitate a view or selection of other content files 115. For example, a listing of the content files 115 to be consumed by the user during the onboarding process can be presented in a top portion of the user interface 109 while a corresponding one of the content files 115 can be rendered in the bottom portion of the user interface 109, or vice versa. As can be appreciated, the user may watch the "Introduction Video," shown in the bottom portion of the user interface 109, while being able to select other content files 115, such as the "Privacy Policy," the "Safety Video," and the "Employment Contract."

Figure 3C:
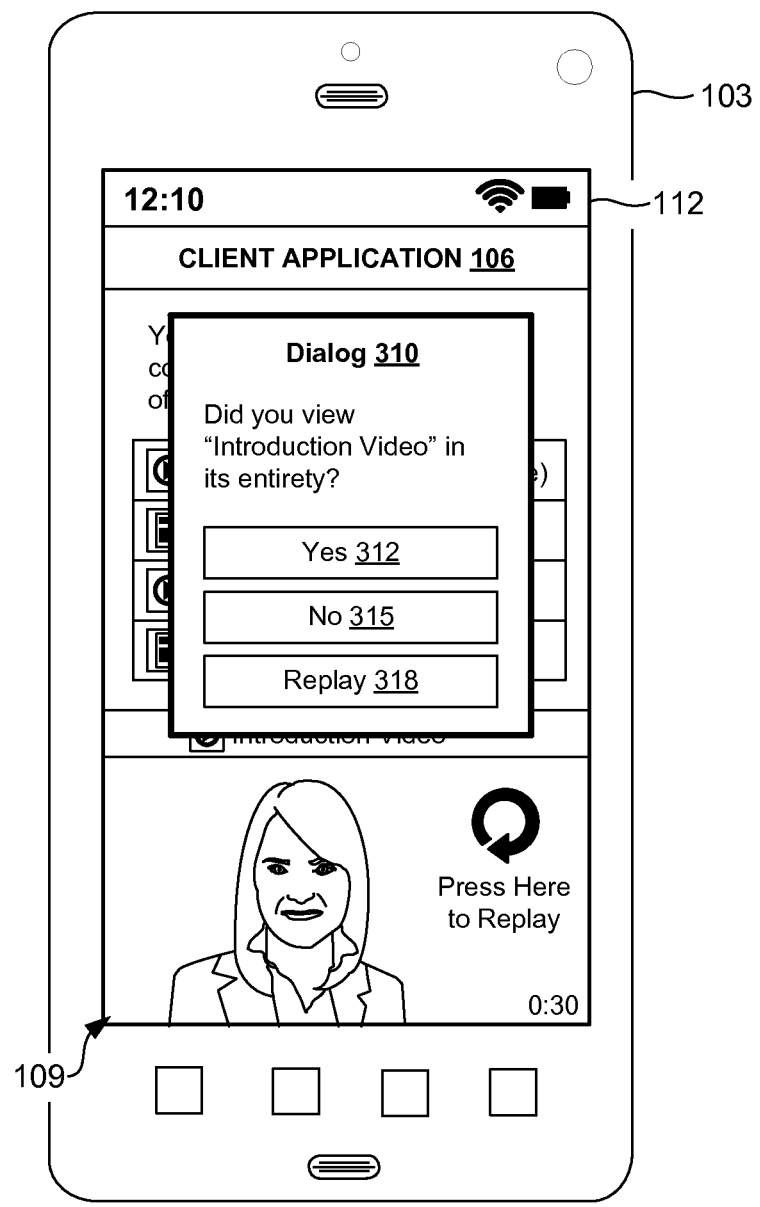

Moving on to FIG. 3C, the client application 106 executable in the client device 103 is shown rendering a user interface 109 in a display 112 of the client device 103. In the example scenario of FIG. 3C, the user interface 109 is shown to a user to obtain a verification from the user that a particular one of the content files 115 has been viewed or otherwise consumed by the user. In some embodiments, a dialog 310 is generated in the user interface 109 such that the user must acknowledge viewing a content file 115 designated as "required" before accessing features of the client device 103.

For example, the user can be required to watch the "Introduction Video" in its entirety before being able to access particular functions 255 of the client device 103. By manipulating the "yes" component 312, a communication can be sent to the remote management application 212 to verify that the user has watched the corresponding content file 115. Conversely, by manipulating the "no" component 315, a communication can be sent to the remote management application 212 to note that the user has not yet watched the corresponding content file 115. By manipulating the "replay" component 315, the content file 115 can be reshown or otherwise presented to the user. For example, the "Introduction Video" can be replayed in a respective portion of the user interface 109.

Figure 3D:
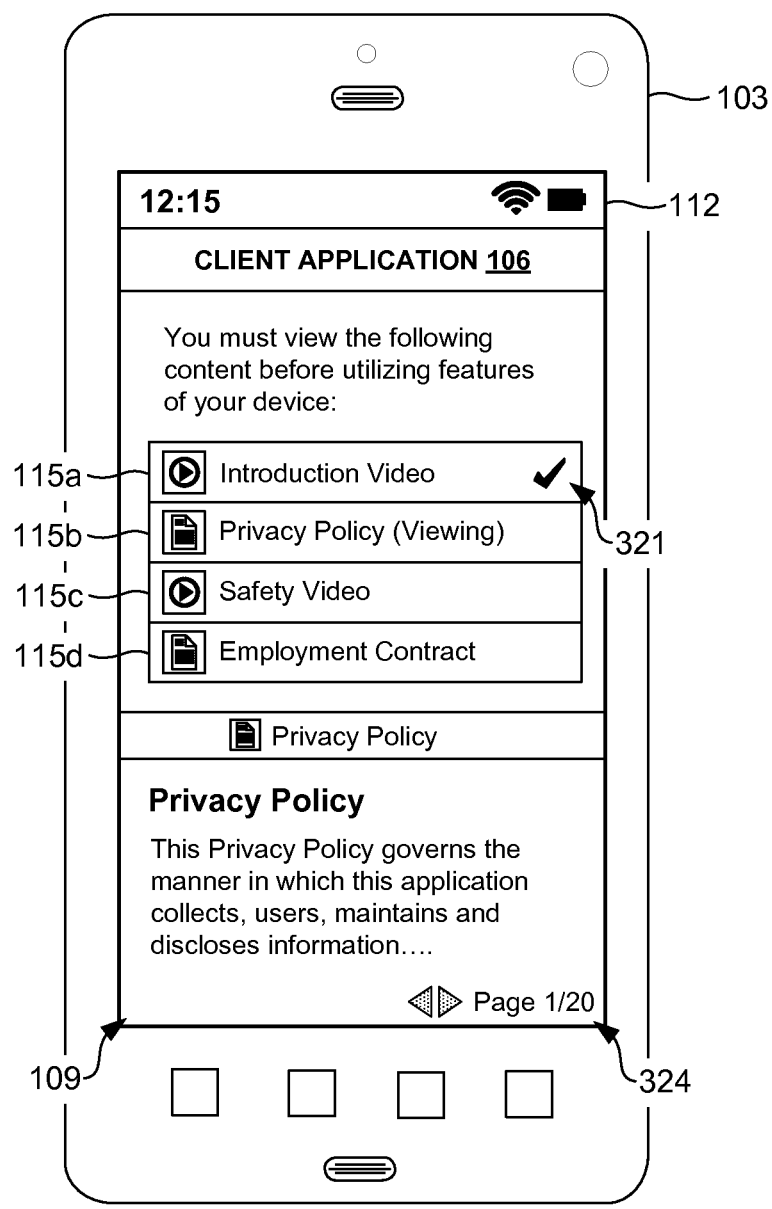

With respect to FIG. 3D, the client application 106 executable in the client device 103 is shown rendering a user interface 109 in a display 112 of the client device 103. In the example of FIG. 3D, the client application 106 is shown having a word processing document, such as "the "Privacy Policy," in a respective portion of the user interface 109. As, the client application 106 is configured to display content files 115a ... 115d (collectively content files 115), after one of the content files 115 is selected and/or viewed by the user, a subsequent one of the content files 115 can be rendered in the user interface 109. For example, after the user has viewed the "Introduction Video," the "Privacy Policy" can be presented in the user interface 109. As the content file 115a corresponding to the "Introduction Video," has been viewed, an indicator 321, such as an icon, image, or other user interface component, can be shown in association with the content file 115a such that the user can easily ascertain whether a respective one of the content files 115 has been viewed by the user.

As the content file 115b corresponds to a word processing document entitled "Privacy Policy," the client application 106 can be configured to comprise features of a standard word processing application. In various embodiments, a signature can be required from the user. The user may edit the word processing application by providing a typed or hand drawn signature using, for example, a touch-screen display of the client device 103. The client application 106 can communicate the modified form of the content file 115 to the remote management application 212 for storage in the data store 209 in association with the user account data 233 (FIG. 2). Further, the client application 106 can comprise a pagination component 324 to facilitate navigation of larger documents.

As the example scenario of FIG. 3D shows a rendering of a content file 115 comprising a document, the client application 106 can be configured whether the user has scrolled to an end of the document, such as "Page 20/20." When the user has reached the end of the document, the client application 106 can automatically send a communication to the remote management application 212 that indicates that the user has viewed or otherwise consumed the corresponding content file 115.

Figure 3E:
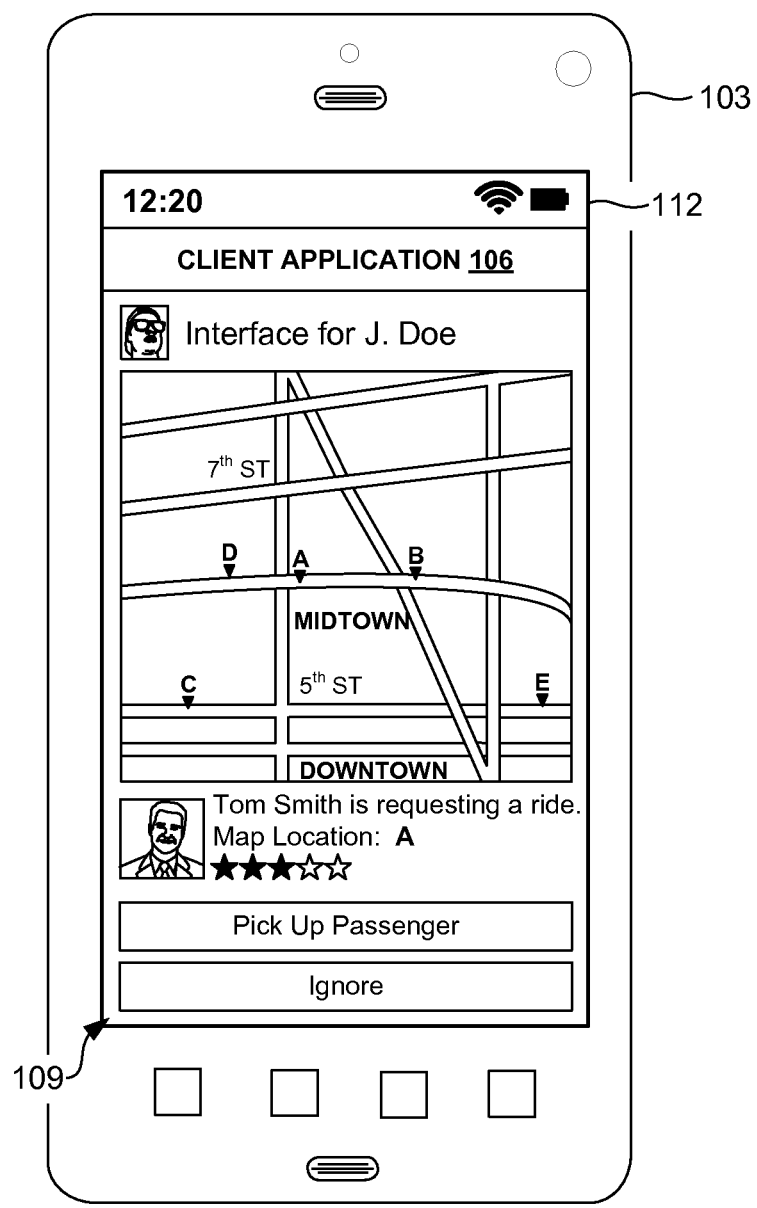

Moving on to FIG. 3E, the client application 106 executable in the client device 103 is shown rendering a user interface 109 in a display 112 of the client device 103. According to various embodiments, the client application 106 can be executed to perform features beyond the onboarding of the user and the presentation of content files 115 (FIG. 1). To this end, a developer of an application can utilize a plugin or a software development kit (SDK) to implement the onboarding features offered by the remote management application 212 in proprietary applications.

In the example of FIG. 3E, the client application 106 can be executed for a driver of a ride-share enterprise where the driver utilizes the client application 106 to identify and drive local passengers from an originating location to a destination location. As the client application 106 has been configured to provide content files 115 to the user, the rideshare features, such as a map, GPS features, or passenger locations, can be shown to the user after all of the content files 115 designated as "required" have been read, viewed, or otherwise consumed by the user.

However, in various embodiments, the remote management application 212 and/or the client application 106 can be employed to determine whether the user has bypassed the onboarding process of the client application 106. For example, the user may have circumnavigated security features of the client application 106. Accordingly, the client application 106 can be configured to ascertain whether features of the client application 106 beyond the onboarding process can be being utilized on the client device 103. To this end, the remote management application 212 and/or the client application 106 can determine whether the client device 103 complies with one or more compliance rules associated with the onboarding process. If the client device 103 fails to comply with the one or more compliance rules, the additional functions 255 of the client device 103 can be disabled by the remote management application 212 and/or the client application 106.

In the example of FIG. 3E, where the client application 106 is associated with a ride-share enterprise, the location of the client device 103 can be determined by the remote management application 212 using measurements obtained by a location module, such as GPS or cellular triangulation, of the client device 103. The remote management application 212 can then determine whether the client device 103 is moving above a predefined speed indicative of the client device 103 being located in an automobile and, if so, the remote management application 212 can perform a remedial action, such as disabling additional functions 255 of the client device 103. In various embodiments, the remote management application 212 can turn off the display 112 of the client device 103, notify an administrator, generate a warning in the user interface 109, disable the location module of the client device 103, disable touch-screen functions 255 of the display 112, or other functions. As can be appreciated, the remedial action can be predefined by a developer implementing the plugin or the SDK or can be modified by an administrator of the remote management application 212.

Figure 4:
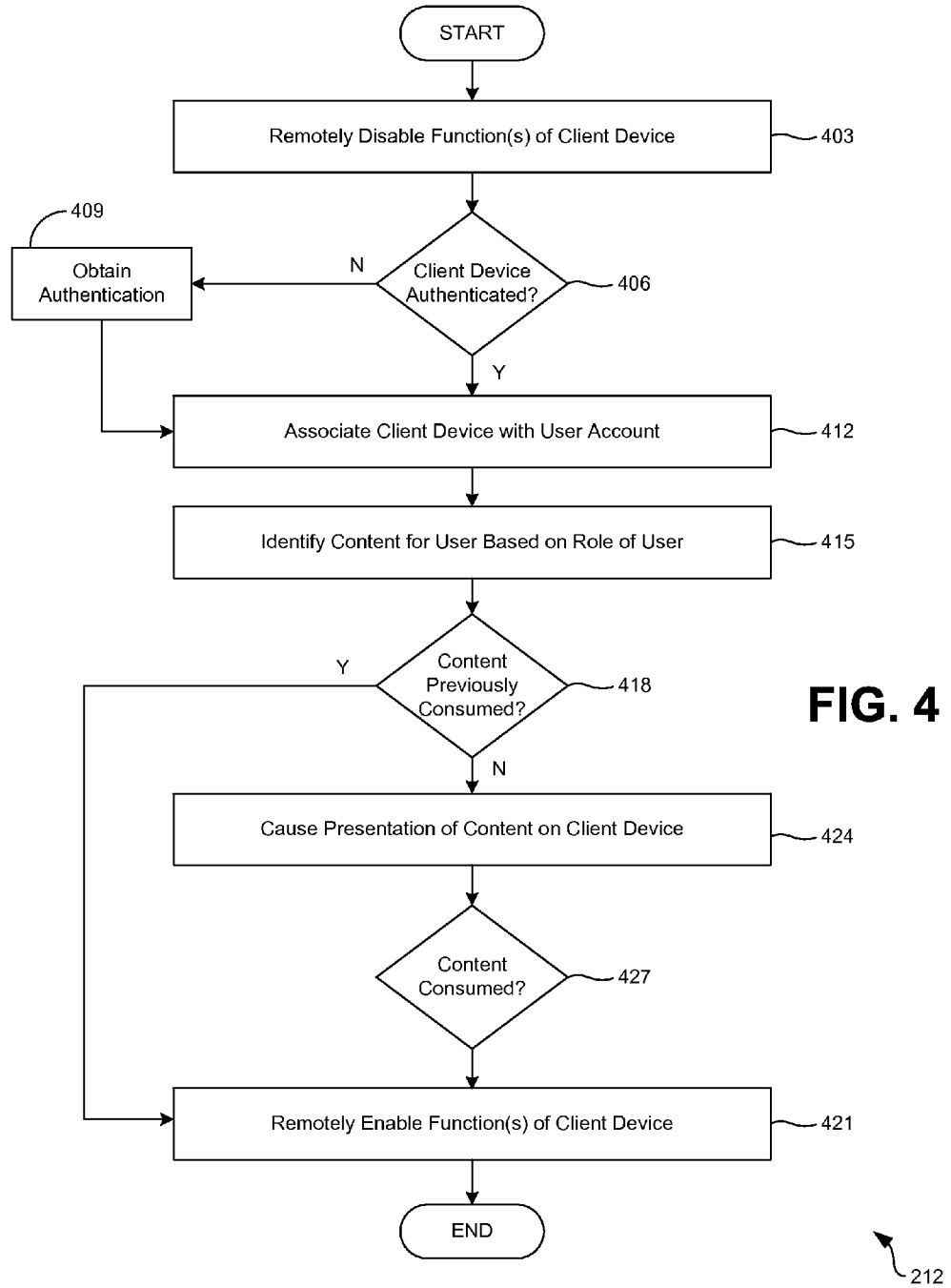
FIG. 4 is a flowchart illustrating an example of functionality of a remote management application according to various embodiments of the present disclosure.

Referring next to FIG. 4, shown is a flowchart that provides one example of the operation of a portion of the remote management application 212 according to various embodiments. It is understood that the flowchart of FIG. 4 provides merely an example of the many different types of functional arrangements that can be employed to implement the operation of the portion of the remote management application 212 as described herein. As an alternative, the flowchart of FIG. 4 can be viewed as depicting an example of elements of a method implemented in the computing environment 203 (FIG. 2) according to one or more embodiments. Functionality attributed to the remote management application 212 can also be implemented in a single process or application executed by the client device 103 (FIG. 1) and/or multiple processes or applications. The separation or segmentation of functionality as discussed herein is presented for illustrative purposes only.

As noted above, when beginning employment, a client device 103 can be provided to a user by an enterprise or, alternatively, the user may bring his or her client device 103 to the workplace. The enterprise may have a policy that certain employees are required to view content associated with a role 245 (FIG. 2) of the user. For example, a user having a marketing position can be required to read marketing-related content during the onboarding process while a different user having a software engineering position can be required to read software-related content during the onboarding process. The client device 103 can be employed to perform an onboarding process where a user of the client device 103 is provided with certain content before the user is permitted to perform certain job functions and/or use certain features of the client device 103. For example, assuming an employee is a driver for a particular enterprise, the employee can be required to watch a driver safety video before driving a vehicle in their scope of employment. Accordingly, it can be assumed that the user has began an onboarding process using the client device 103, for example, by powering on the client device 103, downloading the client application 106 (FIG. 1), and/or executing the client application 106.

Beginning with step 403, one or more functions 255 (FIG. 2) of the client device 103 can be remotely disabled by the remote management application 212. The functions 255 disabled can include, for example, an ability to access other client applications 106, navigate to a home screen of an operating system executable on the client device 103, utilize GPS-based navigation applications, operate hardware components, such as a camera or a speaker of the client device 103, utilize software components, such as drivers, applications, or functions 255 of the operating system of the client device 103, and/or other functions 255. In various embodiments, the client device 103 may come preloaded with certain functions 255 disabled. To this end, the remote management application 212 can determine whether particular functions 255 are disabled and, if not, proceed to disable the functions 255. To disable a function 255 of the client device 103, the remote management application 212 can communicate a command over the network 206 to be performed by the client application 106.

In various embodiments, the one or more functions 255 of the client device 103 can be disabled based on a role 245 of the user. For example, if the user is a driver in his or her scope of employment, the GPS module of the client device 103 can be disabled or otherwise rendered inaccessible. In various embodiments, the client application 106 can be associated with a predefined role 245 such that a role 245 of the user can be determined before the user is authenticated. For example, the client application 106 can be made available for download only to drivers of employee vehicles. In another example, the client device 103 may have the predefined role 245 stored in local memory when the client device 103 is provided to the user. By knowing the role 245 of the driver, the remote management application 212 can remotely disable certain functions 255.

Next, in step 406, it is determined whether the client device 103 has been authenticated. If the client device 103 has not been previously authenticated, the process moves to step 409 where the remote management application 212 obtains authentication from a user of the client device. Authentication of the client device 103 can include, for example, providing a username 303 (FIG. 3), password 306 (FIG. 3), email address, biometric data, or other information that can be compared to authentication data 239 (FIG. 2) in the data store 209 (FIG. 2). In alternative embodiments, the authentication can be performed by comparing a unique identifier of the client device 103 to an identifier stored in the data store 209.

When the client device 103 has been authenticated, in step 412, the remote management application 212 can associate the client device 103 with the user account in the data store 209 (or in a database of the data store 209) to enable future identifications of the client device 103, for example, without requiring the user to perform subsequent authentications. In various embodiments, associating the client device 103 with the user account includes storing a unique identifier of the client device 103 in association with the user account data 233 (FIG. 2) in the data store 209.

Next, in step 415, content is identified for the user. In various embodiments, the content can be identified based on the role 245 of the user. For example, a user having a legal position can be required to read legal-related content during the onboarding process while a different user having a sales position can be required to read sales-related content during the onboarding process. Identifying the content for the user can include accessing corresponding content files 115 from memory for communication to the client device 103. In step 418, it is determined whether the content identified in step 415 has been previously read, watched, or otherwise consumed by the user. For example, the user may have previously consumed content during a previous onboarding process. If the content has been previously consumed, the process proceeds to step 421 where the disabled functions 255 of the client device 103 can be remotely enabled by the remote management application 212. Alternatively, if the content has not been previously consumed by the user, the process proceeds to step 424 where the remote management application 212 causes the presentation of the content on the client device 103.

In various embodiments, the content file 115 to be consumed by the user of the client device 103 is preloaded in local memory of the client device 103 before the client device 103 is provided to the user. With respect to these embodiments, the remote management application 212 can direct the client application 106 to access the content files 115 from the local memory of the client device 103. In alternative embodiments, the client application 106 downloads the content file 115 to be consumed by the user of the client device 103 from the remote management application 212. In other embodiments, the content files 115 can be streamed by the remote management application 212 to the client application 106 such that a complete download of the content on the client device 103 is not required.

In step 427, a determination is made whether the content files 115 presented on the client device 103 have been read, watched, or otherwise consumed. In various embodiments, the client application 106 can require user input from the user that indicates that the user has consumed a particular content file 115. In some embodiments, the client application 106 can measure a time that a particular content file 115 has been rendered in a display. For example, a long rendering time is more indicative of the content actually being consumed by the user. To this end, the time the content file 115 has been rendered in the display 112 (FIG. 1) can be compared against a predefined threshold to determine whether the content file 115 has been consumed, wherein the predefined threshold is indicative of the content file 115 being consumed by the user.

In embodiments where a content file 115 includes a document, such as a word processing document or a spreadsheet, the client application 106 can determine whether the user has scrolled to an end of the document. In other embodiments, the client device 103 can utilize a camera device to determine whether a user has faced the display 112 of the client device 103 for a predefined amount of time. Consequently, the time the user has viewed a content file 115 being rendered in the display 112 can be compared against a predefined threshold to determine whether the content file 115 has been consumed, wherein the predefined threshold is indicative of the content file 115 being consumed by the user.

In various embodiments, the user can be prompted with a series of one or more user interfaces 109 to provide questions to the user associated with the allegedly consumed content file 115. If the user correctly answers a certain number of questions exceeding a predefined threshold, it can be determined that the content file 115 has been consumed by the user.

In response to the content file 115 being consumed by the user, the process proceeds to step 421 where the functions 255 of the client device 103 can be remotely enabled by the remote management application 212. The functions 255 of the client device 103 can include the functions disabled in step 403 or, in some embodiments, the functions 255 of the client device 103 remotely enabled can include functions 255 beyond those disabled by the remote management application 212. To remotely enable the functions disabled in step 403, the remote management application 212 can communicate an additional command to the client device 103 that, when accessed by the client application 106, causes the client application 106 to enable the functions disabled in step 403.

Figure 5:
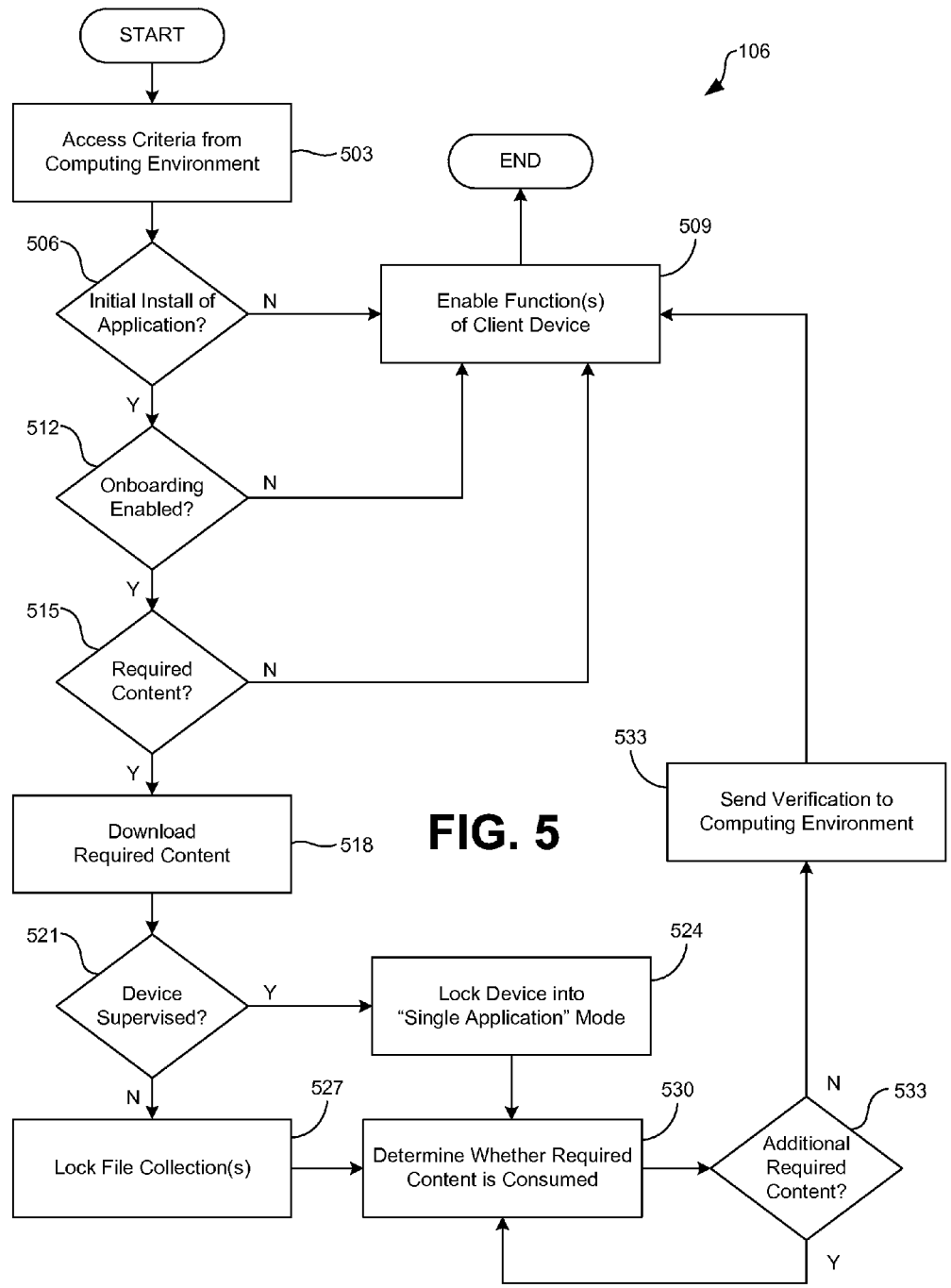
FIG. 5 is another flowchart illustrating an example of functionality of a client application according to various embodiments of the present disclosure.

Referring next to FIG. 5, shown is a flowchart that provides one example of the operation of a portion of the client application 106 according to various embodiments. It is understood that the flowchart of FIG. 5 provides merely an example of the many different types of functional arrangements that can be employed to implement the operation of the portion of the client application 106 as described herein. As an alternative, the flowchart of FIG. 5 can be viewed as depicting an example of elements of a method implemented in the computing environment 203 (FIG. 2) according to one or more embodiments. Functionality attributed to the remote management application 212 can be implemented in a single process or application executed by the client device 103 (FIG. 1) and/or multiple processes or applications. The separation or segmentation of functionality as discussed herein is presented for illustrative purposes only.

As noted above, it can be assumed that the user has began an onboarding process using the client device 103, for example, by powering on the client device 103, downloading the client application 106 (FIG. 1), and/or executing the client application 106. Beginning with step 503, onboarding criteria 236 (FIG. 2) is received from the remote management application 212 (FIG. 2) executable in the computing environment 203 and accessed by the client application 106. In various embodiments, the onboarding criteria 236 includes constraints that must be satisfied before certain functions 255 (FIG. 2) of the client device 103 can be enabled to the user by the remote management application 212. To this end, the onboarding criteria 236 can specify whether a particular content file is "required" to be read, watched, or otherwise consumed by the user before enabling access to particular features of the client device 103. For example, before using a camera of the client device 103, the user can be required to watch a video having content that outlines camera policies for an enterprise. By watching the video, the camera hardware (as well as applications that utilize the camera hardware) can be enabled. The onboarding criteria 236 for the onboarding process can be determined using the role 245 (FIG. 2) assigned for a user.

Next, in step 506, it is determined whether the client application 106 being executed has been previously installed or, in other words, whether the instance is an initial installation of the client application 106. In various embodiments, this can be determined by comparing a unique identifier of the client device 103 with an identifier stored in the data store 209 in association with a user account. If the unique identifier of the client device 103 matches an identifier stored in the data store, it can be determined that the client application 106 has been previously installed and/or executed. As can be appreciated, if the client application 106 has previously been installed and/or executed on a client device 103, then the onboarding process may have been previously performed. In order to escape inefficiency, the process proceeds to step 509 where any disabled functions 255 of the client device 103 can be enabled when it is determined that the onboarding process is complete.

The functions 255 enabled by the client application 106 can include, for example, an ability to access other client applications 106, navigate to a home screen of an operating system executable on the client device 103, utilize GPS-based navigation applications, operate hardware components, such as a camera or a speaker, of the client device 103, utilize software components of the client device 103, and/or other functions 255. In various embodiments, the client device 103 may come preloaded with certain functions 255 enabled. To this end, the remote management application 212 can determine whether particular functions 255 are enabled and, if not, proceed to enable the functions 255.

However, if it is determined that the client application 106 has not been previously installed and/or executed, the process moves on to step 512 where it is determined whether the onboarding process is enabled. As can be appreciated, in some circumstances, an administrator may desire to disable onboarding, such as during server outages. Accordingly, the client application 106 can communicate with the remote management application 212 to determine whether onboarding is enabled for the client device 103. If onboarding is disabled, the process moves to step 509 where any disabled functions 255 of the client device 103 can be enabled.

Alternatively, if onboarding is enabled, the process proceeds to step 515 where it is determined whether any content files 115 are required to be consumed by the user. In various scenarios, the user must acknowledge that a content file 115 designated as "required" has been viewed before accessing features of the client device 103. For example, the user can be required to watch the "Introduction Video" in its entirety before being able to access particular functions 255 of the client device 103. To this end, the functions 255 of the client device 103 can include accessing other client applications 106, accessing a home screen of an operating system executable on the client device 103, viewing global positioning system (GPS)-based navigation applications, utilizing hardware components of the client device 103, or utilizing software components of the client device 103.

If no content files 115 are required to be viewed by the user, the process proceeds to step 509 where any disabled functions 255 of the client device 103 can be enabled. However, if content files 115 are designated as being "required" to be viewed by the user, the process proceeds to step 518 where the content files 115 are downloaded by the client application 106 and stored locally on the client device 103. However, in some embodiments, the download of the required content may not be necessary. For example, in various embodiments, the content files 115 designated as "required" can be preloaded in local memory of the client device 103 before the client device 103 is provided to the user. With respect to these embodiments, the remote management application 212 can direct the client application 106 to access the content files 115 from the local memory of the client device 103. Similarly, in other embodiments, the content files 115 can be streamed by the remote management application 212 to the client application 106 such that a complete download of the content on the client device 103 is not required.

Next, the process proceeds to step 521 where it is determined whether the client device 103 is being "supervised" by the remote management application 212. Supervising the client device 103 can include strictly monitoring the actions performed on the client device 103 and/or limiting the actions capable of being performed. For example, if the client device 103 is being supervised by the remote management application 212, the process proceeds to step 524 where the device is locked into a "single application" mode where no applications beyond the client application 106 are permitted to be accessed by the user. Alternatively, if the client device 103 is not being supervised, the process proceeds to step 527 where collections of files on the client device 103 are locked where the user is unable to access the files until the onboarding process is complete. The collections of files locked can include files preloaded on the client device 103, such as preloaded enterprise files beyond the content files 115 required to be viewed by the user.

After locking the device into the single application mode (step 524) or locking the collection of files on the client device 103 (step 527), the process proceeds to step 530 where a determination is made whether the content files 115 designated as "required" have been consumed by the user. In some embodiments, this can include measuring an amount of time that a particular content file 115 has been rendered in a display. For example, a long rendering time can be indicative of a content file 115 actually being consumed by the user. To this end, the time the content file 115 has been rendered in the display 112 (FIG. 1) can be compared against a predefined threshold to determine whether the content file 115 has been consumed, wherein the predefined threshold is indicative of the content file 115 being consumed by the user.

In embodiments where a content file 115 includes a document, such as a word processing document or a spreadsheet, the client application 106 can determine whether the user has scrolled to an end of the document. In other embodiments, the client device 103 can utilize a camera device to determine whether a user has faced the display 112 of the client device 103 for a predefined amount of time. Consequently, the time the user has viewed a content file 115 being rendered in the display 112 can be compared against a predefined threshold to determine whether the content file 115 has been consumed, wherein the predefined threshold is indicative of the content file 115 being consumed by the user.

In various embodiments, the user can be prompted with a series of one or more user interfaces 109 to provide questions to the user associated with the allegedly consumed content file 115. If the user answers a certain number of questions exceeding a predefined threshold, it can be determined that the content file 115 has been consumed by the user.

In response to the content file 115 being consumed by the user, the process proceeds to step 533 where it is determined whether any additional content files 115 are required to be viewed by the user. If additional content files 115 exist, the process reverts to step 530. Alternatively, the process proceeds to step 536 where a verification is sent to the remote management application 212 that the onboarding process has been completed and all required content files 115 have been viewed by the user. After the verification is sent to the remote management application 212, the process moves to step 509 where the functions 255 of the client device 103 are enabled. Thereafter, the process proceeds to terminate.

The client devices 103 or devices comprising a computing environment 203 can include at least one processor circuit, for example, having a processor and at least one memory device, both of which are coupled to a local interface, respectively. Such a device can comprise, for example, at least one computer, a mobile device, smartphone, computing device or like device. The local interface can comprise, for example, a data bus with an accompanying address/control bus or other bus structure as can be appreciated.

Stored in the memory device are both data and several components that are executable by the processor. In particular, stored in the one or more memory device and executable by the processor of such a device can be the client application 106, and potentially other applications. Also stored in the memory can be a data store 209 and other data.

A number of software components are stored in the memory and are executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors, or between any processor and any of the memory devices. The local interface can comprise additional systems designed to coordinate this communication, including, for example, performing load balancing. The processor can be of electrical or of some other available construction.

The client devices 103 can include a display 112 upon which a user interface 109 generated by the client application 106 or another application can be rendered. The client device 103 can also include one or more input/output devices that can include, for example, a capacitive touchscreen or other type of touch input device, fingerprint reader, or keyboard.

Although the remote management application 212, the client application 106, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components. Such technologies are generally well known by those skilled in the art and, consequently, are not described in detail herein.

The sequence diagram and flowcharts show an example of the functionality and operation of an implementation of portions of components described herein. If embodied in software, each block can represent a module, segment, or portion of code that comprises program instructions to implement the specified logical function(s). The program instructions can be embodied in the form of source code that comprises human-readable statements written in a programming language or machine code that comprises numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted. In addition, any number of counters, state variables, warning semaphores, or messages might be added to the logical flow described herein, for purposes of enhanced utility, accounting, performance measurement, or providing troubleshooting aids. It is understood that all such variations are within the scope of the present disclosure.

Also, any logic or application described herein that comprises software or code can be embodied in any non-transitory computer-readable medium for use by or in connection with an instruction execution system such as, for example, a processor in a computer system or other system. In this sense, the logic can comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include solid-state drives, or flash memory. Further, any logic or application described herein can be implemented and structured in a variety of ways. For example, one or more applications described herein can be implemented as modules or components of a single application. Further, one or more applications described herein can be executed in shared or separate computing devices or a combination thereof. For example, a plurality of the applications described herein can execute in the same computing device, or in multiple computing devices. Additionally, it is understood that terms such as "application," "service," "system," "engine," "module," and so on can be interchangeable and are not intended to be limiting.

It is emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A non-transitory computer-readable medium embodying a program executable in at least one computing device comprising at least one hardware processor, the program, when executed by the at least one computing device, being configured to cause the at least one computing device to:
transmit a first command to a client device to disable at least one function of the client device;
associate the client device with a user account in a data store based at least in part on an authentication of a user of the client device, the user account comprising at least one role associated with the user;
search the data store to identify content to be presented by the client device based at least in part on the role of the user; and
transmit a second command to remotely enable the disabled at least one function of the client device in response to a determination that the content has been viewed by the user of the client device, wherein the determination is based at least in part on a confirmation provided by the client device, wherein the determination that the content has been viewed by the user of the client device is made based at least in part on an amount of time the content has been rendered in a display of the client device, whether the user has scrolled to an end of the content, a detection of a face by a camera of the client device exceeding a predefined amount of time, or an acknowledgement made by the user in a user interface provided in association with the content.

2. The non-transitory computer-readable medium of claim 1, wherein the at least one function of the client device is disabled remotely by the at least one computing device in response to an enrollment of the client device with a remote application executable in the at least one computing device.

3. The non-transitory computer-readable medium of claim 1, wherein the program, when executed by the at least one computing device, is further configured to cause the at least one computing device to:
monitor a location of the client device using at least one measurement obtained by a location module of the client device;
determine whether the client device is moving above a predefined speed indicative of the client device being located in an automobile; and in response to the client device moving above the predefined speed indicative of the client device being located in the automobile, remotely disabling at least one additional function of the client device.

4. The non-transitory computer-readable medium of claim 1, further comprising program code that, when executed, causes the at least one computing device to:
   determine whether the client device complies with at least one compliance rule; and
   in response to the at least one computing device failing to comply with the at least one compliance rule, remotely disabling at least one additional function of the client device.

5. The non-transitory computer-readable medium of claim 1, wherein the at least one function of the client device disabled is at least one hardware function or at least one software function.

6. The non-transitory computer-readable medium of claim 5, wherein the at least one software function of the client device disabled is an ability to access at least one different client application, access a home screen of an operating system of the client device, view a global positioning system (GPS)-based navigation application, or utilize a driver of the client device.

7. The non-transitory computer-readable medium of claim 5, wherein the at least one hardware function of the client device disabled is an ability to utilize a camera of the client device, a display of the client device, a location module of the client device, or a speaker of the client device.

8. The non-transitory computer-readable medium of claim 1, wherein the first command is transmitted to the client device to disable the at least one function of the client device in response to an initial execution of a client application installed on the client device.

9. A computer-implemented method, comprising:
   sending, by at least one remote computing device comprising at least one hardware processor, a first command to a client device that causes a client application executable in the client device to disable at least one function of a client device;
   associating, by the at least one remote computing device, a user account with the client device in a data store based at least in part on an authentication of a user of the client device, the user account comprising at least one role associated with the user;
   searching, by the at least one remote computing device, the data store to identify content to be presented by the client device based at least in part on the role of the user; and
   sending, by the at least one remote computing device, a second command to the client device that causes the client application to enable at least one function of the client device in response to a determination that the content has been viewed by the user of the client device, wherein the determination is based at least in part on a confirmation provided by the client device, wherein the determination that the content has been viewed by the user of the client device is made based at least in part on an amount of time the content has been rendered in a display of the client device, whether the user has scrolled to an end of the content, a detection of a face by a camera of the client device exceeding a predefined amount of time, or an acknowledgement made by the user in a user interface provided in association with the content.

10. The computer-implemented method of claim 9, wherein the at least one function of the client device is disabled remotely by the at least one computing device in response to an installation or an execution of the client application on the client device.

11. The computer-implemented method of claim 9, further comprising:
   monitoring, by the at least one remote computing device, a location of the client device using at least one measurement obtained by a location module of the client device;
   determining, by the at least one remote computing device, whether the client device is moving above a predefined speed indicative of the client device being located in an automobile; and
   in response to the client device moving above the predefined speed indicative of the client device being located in the automobile, disabling, by the at least one remote computing device, at least one additional function of the client device.

12. The computer-implemented method of claim 9, further comprising:
   determining, by the at least one remote computing device, whether the client device complies with at least one compliance rule; and
   in response to the at least one computing device failing to comply with the at least one compliance rule, disabling, by the at least one remote computing device, at least one additional function of the client device.

13. The computer-implemented method of claim 9, wherein the at least one function of the client device disabled is at least one hardware function or at least one software function.

14. The computer-implemented method of claim 13, wherein the at least one software function of the client device disabled is an ability to access at least one different client application, access a home screen of an operating system of the client device, view a global positioning system (GPS)-based navigation application, or utilize a driver of the client device.

15. The computer-implemented method of claim 13, wherein the at least one hardware function of the client device disabled is an ability to utilize a camera of the client device, a display of the client device, a location module of the client device, or a speaker of the client device.

16. A system, comprising:
   a client device in communication with a remote management application over a network; and
   program code that, when executed by the client device, causes the client device to at least:
      access a first command received from the remote management application over the network that disables at least one function of the client device in response to an execution of a client application performed in the client device, the client application being configured to authenticate the client device with the remote management application using at least a user account associated with the client device, the user account comprising at least one role associated with the user;
      cause a request to be communicated to the remote management application to retrieve content from a remote data store to be presented by the client device based at least in part on the role of the user;
      cause the content retrieved from the remote management application to be rendered on a display of the client device; and
      access a second command received from the remote management application over the network that enables the disabled at least one function of the client device in response to a determination that the content has been viewed by the user of the client device, wherein the determination that the content has been viewed by the user of the client device is made based at least in part on an amount of time the content has been rendered in a display of the client device, whether the user has scrolled to an end of the content, a detection of a face by a camera of the client device exceeding a predefined amount of time, or an acknowledgement made by the user in a user interface provided in association with the content.

17. The system of claim 16, wherein the at least one function of the client device disabled is at least one hardware function or at least one software function.

18. The system of claim 17, wherein the at least one software function of the client device disabled is an ability to access at least one different client application, access a home screen of an operating system of the client device, view a global positioning system (GPS)-based navigation application, or utilize a driver of the client device.

19. The system of claim 17, wherein the at least one hardware function of the client device disabled is an ability to utilize a camera of the client device, a display of the client device, a location module of the client device, or a speaker of the client device.

20. The system of claim 16, further comprising program code that, when executed by the client device, causes the client device to at least:

monitor a location of the client device using at least one measurement obtained by a location module of the client device;

determine whether the client device is moving above a predefined speed indicative of the client device being located in an automobile; and in response to the client device moving above the predefined speed indicative of the client device being located in the automobile, disable at least one additional function of the client device.

* * * * *